(12) United States Patent
Constantinou et al.

(10) Patent No.: US 11,385,368 B2
(45) Date of Patent: Jul. 12, 2022

(54) SIMULTANEOUS DISTRIBUTED MEASUREMENT MONITORING OVER MULTIPLE FIBERS

(71) Applicant: SCHLUMBERGER TECHNOLOGY CORPORATION, Sugar Land, TX (US)

(72) Inventors: Alexis Constantinou, Clamart (FR); Arthur Hartog, Cambridge (GB); Theo Cuny, Clamart (FR)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 48 days.

(21) Appl. No.: 16/635,901

(22) PCT Filed: Jul. 29, 2018

(86) PCT No.: PCT/US2018/044271
§ 371 (c)(1),
(2) Date: Jan. 31, 2020

(87) PCT Pub. No.: WO2019/027854
PCT Pub. Date: Feb. 7, 2019

(65) Prior Publication Data
US 2020/0233107 A1 Jul. 23, 2020

(30) Foreign Application Priority Data
Aug. 1, 2017 (EP) .................................... 17290099

(51) Int. Cl.
*G01V 1/22* (2006.01)
*G01D 5/26* (2006.01)
(52) U.S. Cl.
CPC ............ *G01V 1/226* (2013.01); *G01D 5/268* (2013.01)

(58) Field of Classification Search
None
See application file for complete search history.

(56) References Cited

U.S. PATENT DOCUMENTS

| 7,595,865 B2 | 9/2009 | Hartog et al. |
| 10,067,030 B2 | 9/2018 | Hartog et al. |
| (Continued) | | |

FOREIGN PATENT DOCUMENTS

| CN | 106525091 A | 3/2017 |
| WO | 2016086310 A1 | 6/2016 |
| WO | 2017125717 A1 | 7/2017 |

OTHER PUBLICATIONS

Hartog, A., Liokumovich, L.B., Ushakov, N.A., Kotov, O.I., Dean, T., Cuny, T. and Constantinou, A., 2016, The Use of Multi-frequency Acquisition to Significantly Improve the Quality of Fibre-optic Distributed Vibration Sensing, 78th EAGE Conference and Exhibition 2016.

(Continued)

*Primary Examiner* — Lisa M Caputo
*Assistant Examiner* — Nigel H Plumb

(57) ABSTRACT

A distributed measurement system includes a first distributed optical sensing fiber deployed along a first desired measurement path and a second distributed optical sensing fiber deployed along a second desired measurement path. The system further includes an interrogation system coupled to the first distributed optical sensing fiber and to the second distributed optical sensing fiber. The system also includes a first distributed measuring instrument launch a first interrogating probe pulse set comprising a first pulse having a first frequency and a second pulse having a second frequency. The interrogation system is designed to direct the first pulse to the first distributed optical sensing fiber and the second pulse to the second distributed optical sensing fiber.

18 Claims, 7 Drawing Sheets

(56) References Cited

U.S. PATENT DOCUMENTS

| | | |
|---|---|---|
| 2008/0123467 A1 | 5/2008 | Ronnekleiv et al. |
| 2013/0113629 A1 | 5/2013 | Hartog et al. |
| 2013/0301037 A1 | 11/2013 | Handerek |
| 2015/0285683 A1 | 10/2015 | Ouellette |
| 2015/0323455 A1 | 11/2015 | Handerek |
| 2016/0161631 A1 | 6/2016 | Jaaskelainen |
| 2016/0363694 A1 | 12/2016 | Roy et al. |
| 2017/0205253 A1 | 7/2017 | Handerek |
| 2019/0169985 A1 | 6/2019 | Dickenson et al. |

OTHER PUBLICATIONS

International Search report and written opinion issued in the PCT application PCT/US2018/044271, dated Nov. 13, 2018 (18 pages).
International Preliminary Report on Patentability issued in the PCT application PCT/US2018/044271, dated Feb. 4, 2020 (14 pages).
Extended European Search Report issued in European Patent Application No. 18840545.0 dated Mar. 22, 2021, 12 pages.

SIMULTANEOUS DISTRIBUTED MEASUREMENT MONITORING OVER MULTIPLE FIBERS

CROSS REFERENCE PARAGRAPH

This application claims the benefit of E.P. Patent Application No. 17290099.5, entitled "SIMULTANEOUS DISTRIBUTED MEASUREMENT MONITORING OVER MULTIPLE FIBERS," filed Aug. 1, 2017, the disclosure of which is hereby incorporated herein by reference.

BACKGROUND

Hydrocarbon fluids such as oil and natural gas are obtained from a subterranean geologic formation, referred to as a reservoir, by drilling a well that penetrates the hydrocarbon-bearing formation. Once a wellbore is drilled, various forms of well completion components may be installed in order to control and enhance the efficiency of producing the various fluids from the reservoir. Information from the wells can prove valuable, but reliably obtaining useful information from the well is difficult.

One manner in which information can be obtained from a well is to use a distributed fiber optic sensing system, such as a distributed temperature sensing system, a distributed strain sensing system, or a distributed vibration or acoustic sensing system. Fiber optic sensors employ the fact that environmental effects, such as pressure, strain, vibration, and temperature, can alter the amplitude, phase, frequency, spectral content, or polarization of light propagated through an optical fiber. Advantages of fiber optic sensors include their light weight, small size, passive nature, energy efficiency, and ruggedness. In addition, fiber optic sensors have the potential for very high sensitivity, and wide bandwidth. Yet further, certain classes of sensors can be distributed along the length of an optical fiber so that an appropriate interrogation system can be employed to monitor selected environmental parameters at multiple locations at the same time. For instance, when deployed in a hydrocarbon well, a fiber optic sensor can provide indications of characteristics of production fluids, such as fluid composition, density, viscosity, flow rate, etc. Various drilling, production and remedial operations can then be performed based on the information derived from the monitored parameters.

BRIEF DESCRIPTION OF THE DRAWINGS

Certain embodiments of the invention are described with reference to the accompanying drawings, wherein like reference numerals denote like elements. It should be understood, however, that the accompanying drawings illustrate only the various implementations described herein and are not meant to limit the scope of various technologies described herein. The drawings show and describe various embodiments of the current invention.

SUMMARY

Figure 1:
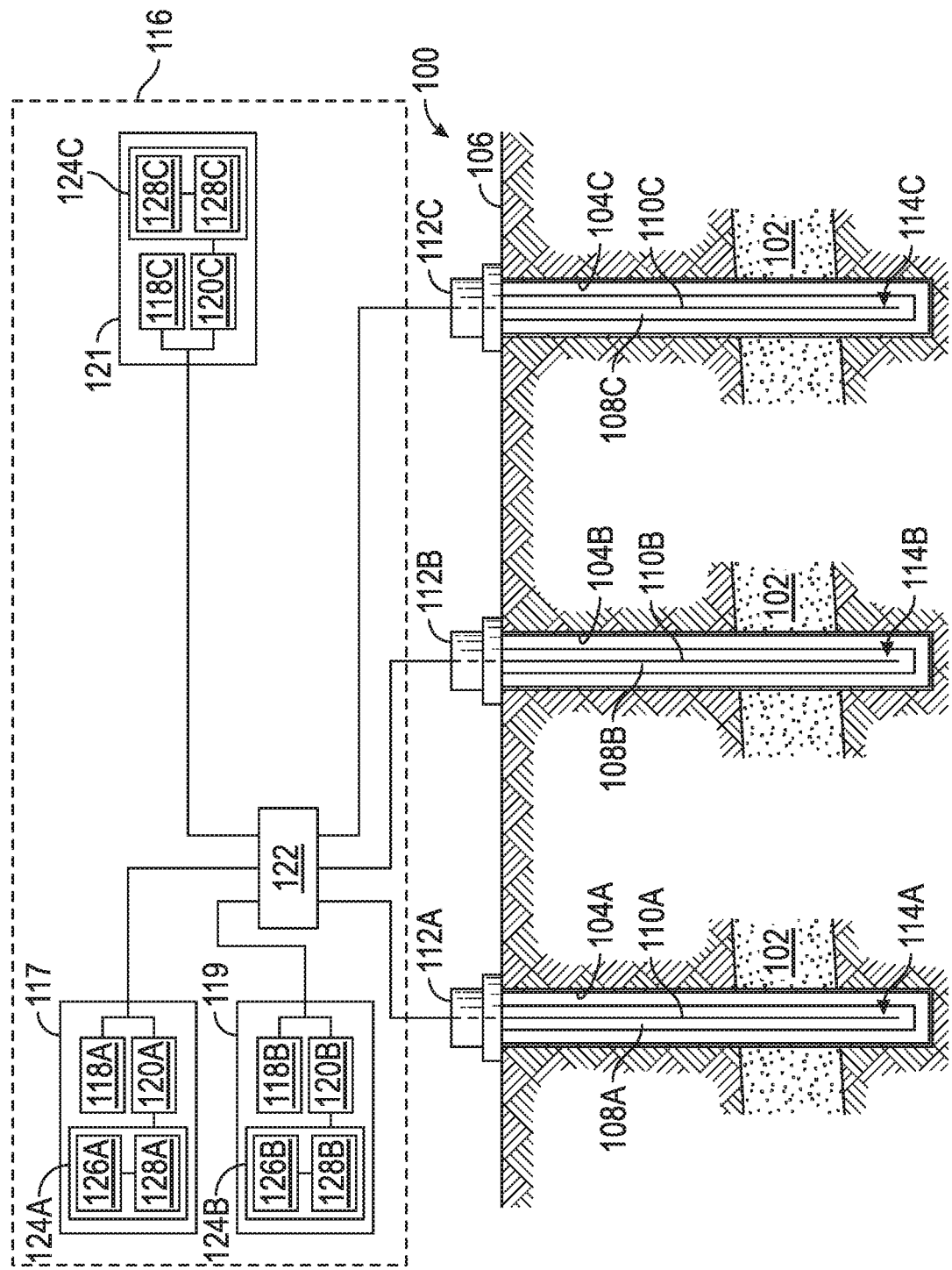
FIG. 1 is a cross-sectional schematic view of a sensing system for obtaining simultaneous distributed measurements from optical sensing fibers deployed in a wellbore, according to one or more aspects of the present disclosure.

Certain embodiments of the present disclosure are directed to a distributed measurement system that includes a first distributed optical sensing fiber deployed along a first desired measurement path and a second distributed optical sensing fiber deployed along a second desired measurement path. The system further includes an interrogation system coupled to the first distributed optical sensing fiber and to the second distributed optical sensing fiber. The system also includes a first distributed measuring instrument launch a first interrogating probe pulse set comprising a first pulse having a first frequency and a second pulse having a second frequency. The interrogation system is designed to direct the first pulse to the first distributed optical sensing fiber and the second pulse to the second distributed optical sensing fiber.

Embodiments disclosed herein also are directed to a distributed measurement system that includes distributed optical sensing fibers, each deployed along a separate measurement path, and an interrogation system coupled to the plurality of distributed optical sensing fibers. The system also includes distributed measuring instruments, each coupled to the interrogation system and each configured to generate a first interrogating probe pulse to launch into the interrogation system at a first time and a second interrogating probe pulse to launch into the interrogation system at a second time. The interrogation system is designed to direct each of the first interrogating probe pulses into a separate distributed optical sensing fiber and to direct each of the second interrogating probe pulses into another separate distributed optical sensing fiber.

Embodiments disclosed herein further are directed to a method for making simultaneous distributed measurements along a plurality of distributed optical sensing fibers each deployed along a separate measurement path. The method includes launching a first series of interrogating probe pulses from a first distributed measuring instrument to an interrogation system and directing the interrogating probe pulses of the first series sequentially to a first distributed optical sensing fiber deployed along a first desired measurement path and to a second distributed optical sensing fiber deployed along a second desired measurement path.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Embodiments of the present disclosure are directed to systems and techniques for using optical fibers to detect various environmental parameters of interest along the fiber. The optical fiber(s) can be deployed in an oilfield well or in any other suitable environment, such as for electrical cable monitoring, pipeline leak monitoring and blockage (e.g., waxing/asphaltenes/hydrate/mineral deposits in flowlines or inappropriate disposal of foreign material in waste pipes, fire detection, intrusion detection, mass transport systems and tunnels monitoring, waste discharge pipe monitoring, etc. In oilfield well applications, as an example, characteristics of fluid flow in a well are of particular interest, including fluid density, viscosity, flow rate and composition (e.g., fractional composition of gas/water/oil). In general, one way to detect fluid flow is to monitor the ambient vibration or acoustic noise associated with the flow in a region of interest. This vibration or acoustic noise can be logged as a function of location and, thus, provide valuable information that can be used to control and/or enhance production, to perform remedial measures, and/or to assess well integrity (e.g., casing leaks, etc.). A fiber optic monitoring system, such as a system that employs an optical fiber that is configured to provide a distributed response to acoustic events or strain events, can be used to monitor the ambient flow noise in the region of interest. Temperature measurements also provide valuable information, and a fiber optic monitoring system that employs an optical fiber can be used to monitor the environmental conditions in the region of interest.

In general, fiber optic monitoring systems, particularly distributed fiber-optic monitoring systems, employ an optical source (e.g., a laser) to generate pulses of optical energy to launch into an optical fiber that is deployed in a region of interest (e.g., in a wellbore). As the launched pulses travel along the length of the optical fiber, small imperfections in the fiber reflect a portion of the pulses, generating backscatter. When the fiber is subjected to events in the region of interest (such as vibration or acoustic signals propagating through the region of interest, strain on the fiber, temperature changes, etc.), the distances between the imperfections change. Consequently, the backscattered light also changes. By monitoring the changes in the backscatter light generated by the fiber (e.g., spontaneous Raman scattering, stimulated Brillouin scattering, or Rayleigh scattering) in response to interrogating probe signals launched into the fiber from an interrogation system, it is possible to determine characteristics of the event(s) (e.g., temperature, strain, vibration) experienced by the fiber. The measured event(s) can then be used to derive information about the region of interest. It should be noted that some types (so-called spread-spectrum) of distributed sensors operate using coded sequences of pulses or indeed swept-frequency signals. Although the examples provided have largely drawn on time-domain interrogation, spread spectrum interrogation may also be used in the scope of the disclosure.

One type of fiber optic monitoring system is referred to as a Distributed Vibration Sensing (DVS or hDVS) system or, alternatively, a Distributed Acoustic Sensing (DAS) system or iDAS system. For convenience, DVS, heterodyne DVS (hDVS) and DAS systems are generally referred to herein as a DVS system. DVS systems have been used to efficiently gather data in applications such a pipeline security monitoring and vertical seismic profiling. DVS systems also have been deployed to monitor fluid flow in subterranean wellbores. Another type of fiber optic monitoring system is referred to as a Distributed Temperature Sensing (DTS) system. DTS systems have been used to derive a temperature profile in a wellbore and in other applications where temperature changes can provide information about a region of interest, such as to detect fluid flow, pipeline leaks, overheating conditions, stress, etc. A further type of fiber optic monitoring system is referred to as a Distributed Strain Sensing (DSS) or a Distributed Strain and Temperature Sensing (DSTS) system. For convenience, DSS and DSTS systems are generally referred to herein as a DSS system. DSS systems have been employed to determine flow profiles in wellbores by analyzing strain changes experienced by optical fibers. Multiple types of distributed sensing systems and techniques are known and any of these types of known systems and techniques, as well as systems and techniques yet to be developed, can be used to obtain the distributed measurements described herein.

While DVS, DTS, and DSS systems have been used in many types of applications, separate optical interrogators are typically needed for each different type of measurement or for each different optical fiber. Consequently, multiple optical interrogators must be installed in order to obtain substantially simultaneous measurements of different types of parameters, or of similar types of parameters in different locations, increasing the cost of new installations and reducing compatibility with existing fiber deployment systems, such as a slickline or wireline unit or cable that may not contain the required number of optical interrogators. Accordingly, embodiments of the present disclosure are directed to a system that allows distributed measurements to be made substantially simultaneously on one or more fibers using a single optical interrogator.

The system may find application in many environments, such as seismic surveys where multiple wells are being acquired with a single optical interrogator or leak detection where multiple wells are being monitored simultaneously to obtain a leak log in real-time. Well integrity is another application to monitor casing shearing with DSS on multiple wells or pipeline monitoring for subsea applications where fiber range is important due to long distance umbilical.

Turning now to FIG. 1, a cross-sectional, schematic representation of a well system 100 that penetrates a subterranean formation 102 is shown. The well system 100 is formed by drilling boreholes 104A, 104B, and 104C through the surface 106 so that they penetrate the subterranean formation 102. Casings 108A, 1086, and 108C can then be lowered and set in place. In FIG. 1, cables containing distributed fiber optic sensors 110A, 110B, and 110C are deployed in the boreholes 104A, 104B, and 104B, respectively to measure parameters of interest. The sensors 110A, 110B, and 110C each extend through a wellhead 112A, 112B, and 112C and terminate at a far end 114A, 114B, or 114C at a depth in the borehole 104A, 104B, or 104C. Although a cased well structure is shown, it should be understood that embodiments of the invention are not limited to this illustrative example. Uncased, open hole, gravel packed, deviated, horizontal, multi-lateral, deep sea or terrestrial surface injection and/or production wells (among others) may incorporate the systems and techniques as described. Further, the fiber optic sensors 110A, 110B, and 110C can be permanently installed in the well system 100 or can be removably deployed in the well system, such as for use during remedial operations.

The fiber optic sensors 110A, 110B, and 110C generally are contained within a protective casing or a conduit (e.g., a control line). As shown in FIG. 1, the fiber optic sensors 110A, 110B, and 110C are coupled to an interrogation and acquisition system 116, which is arranged to acquire data from the optical fibers 110A, 110B, and 110C using any suitable technique. To that end, the system 116 includes a first distributed measuring instrument 117 (e.g., a DTS instrument), a second distributed measuring instrument 119 (e.g., a DVS instrument), and a third distributed measuring instrument 121 (e.g., a DSS instrument), each of which are configured to interrogate and acquire data from the optical fibers 110A, 110B, and 110C. For example, instrument 117 interrogates and acquires data from the optical fibers 110A, 110B, and 110C; instrument 119 interrogates and acquires data from the optical fibers 110A, 110B, and 110C; and instrument 121 interrogates and acquires data from the optical fibers 110A, 110B, and 110C. Each of instruments 117, 119, and 121 includes an optical source 118A, 118B, or 118C (e.g., a coherent narrowband laser) to generate an optical probe signal (e.g., one or more pulses) to launch into the fiber 110A, 110B, or 110C, such as through a circulator. The instruments 117, 119, and 121 also each includes an optical receiver/detector 120A, 120B, or 120C (e.g., a photodetector) to detect backscattered light generated by the fibers 110A, 110B, and 110C in response to the interrogating optical signal.

Further, the measuring instruments 117, 119 and 121 can include a processing system 124A, 124B, or 124C having one or more processing devices 126 and memory devices 128 to process the acquired data. In other embodiments, the data acquired by the instruments 117, 119, and 121 can be processed at a remote location.

The arrangement shown in FIG. 1 also includes an interrogation system 122 that couples the instruments 117, 119, and 121 to the sensing fibers 110A, 110B, and 110c and allows for substantially simultaneous measurements of different parameters of interest. In certain embodiments, the interrogation system 122 may be located at the surface with the other surface equipment, such as the instruments 117, 119, and 121. However, in other embodiments, the interrogation system 122 may be located remote from the surface equipment, for example near the wellheads 112. For subsea wells, in certain embodiments, the interrogation system 122 may be located subsea at the wellhead and connected to the surface via an umbilical. Schematic illustrations of example deployments of the interrogation system 122 with instruments 117, 119, and 121 and sensing fibers 110A, 110B, and 110C are shown in FIGS. 2-7.

Figure 2:
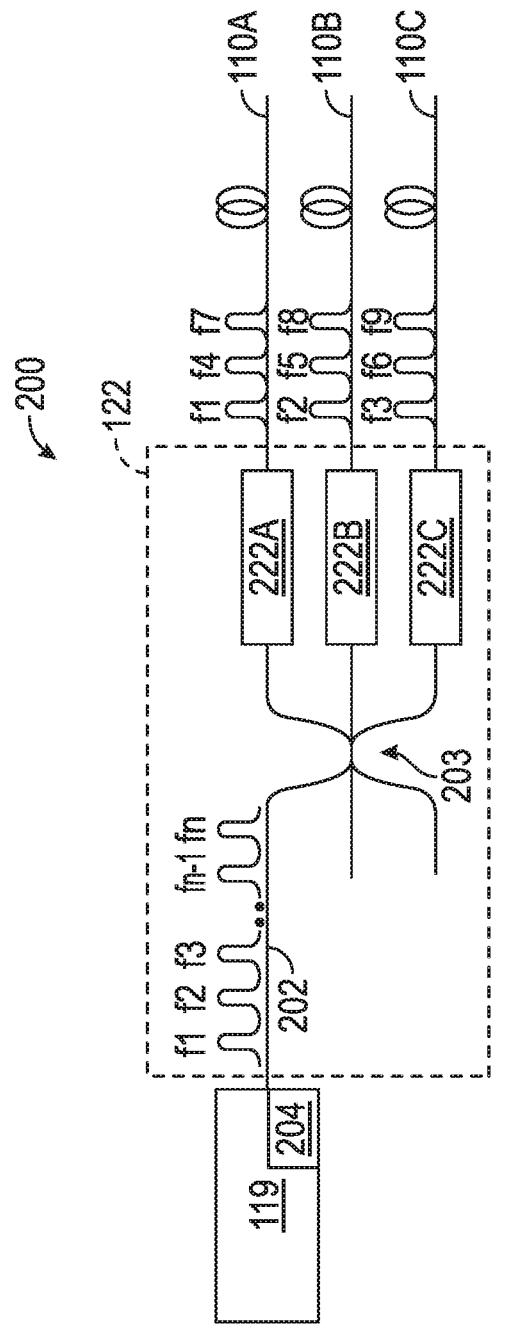
FIG. 2 is a schematic illustration of an embodiment of an interrogation system, according to one or more aspects of the present disclosure.

With reference to FIG. 2, a first example embodiment of a fiber optic sensing system 200 that includes the interrogation system 122 is schematically shown. The interrogation system 122 is designed to selectively launch multiple optical pulses at different frequencies to each of the sensing fibers 110A, 110B, and 110C.

As shown in FIG. 2, an output fiber section 202 connects the instrument 119 to the interrogation system 122. The instrument 119 directs a high power optical pulse through the output fiber section 202 to the interrogation system 122 where a coupler 203 separates the high power optical pulse into a number of paths, corresponding to the number of sensing fibers 110 included in the well system. In the illustrated embodiment, the coupler 203 separates the high power optical pulse into three paths, one for each of the sensing fibers 110A, 110B, and 110C. However, in other embodiments, the coupler 203 may separate the high power optical pulse into any number of paths, corresponding to the number of sensing fibers 110 in the well system. For example, in certain embodiments, the coupler 203 may separate the optical pulse into 5, 10, 15, or 20 paths, for well systems with a corresponding number of sensing fibers.

The instrument 119 includes a frequency generator 204 designed to launch multiple optical pulses at different frequencies. According to certain embodiments, the frequency generator 204 may include an acousto-optic modulator that simultaneously defines a probe pulse and shifts it frequency. A frequency-shifting optical ring circuit may also be employed, as further described in U.S. Patent Publication No. 2013/0113629, which is incorporated herein by reference in its entirety for all purposes. In certain embodiments, the frequency generator 204 may be designed to generate three pulses, each at a different frequency, in quick succession, such that three pulses each at a different frequency, are directed to the coupler 203 substantially simultaneously.

Figure 3:
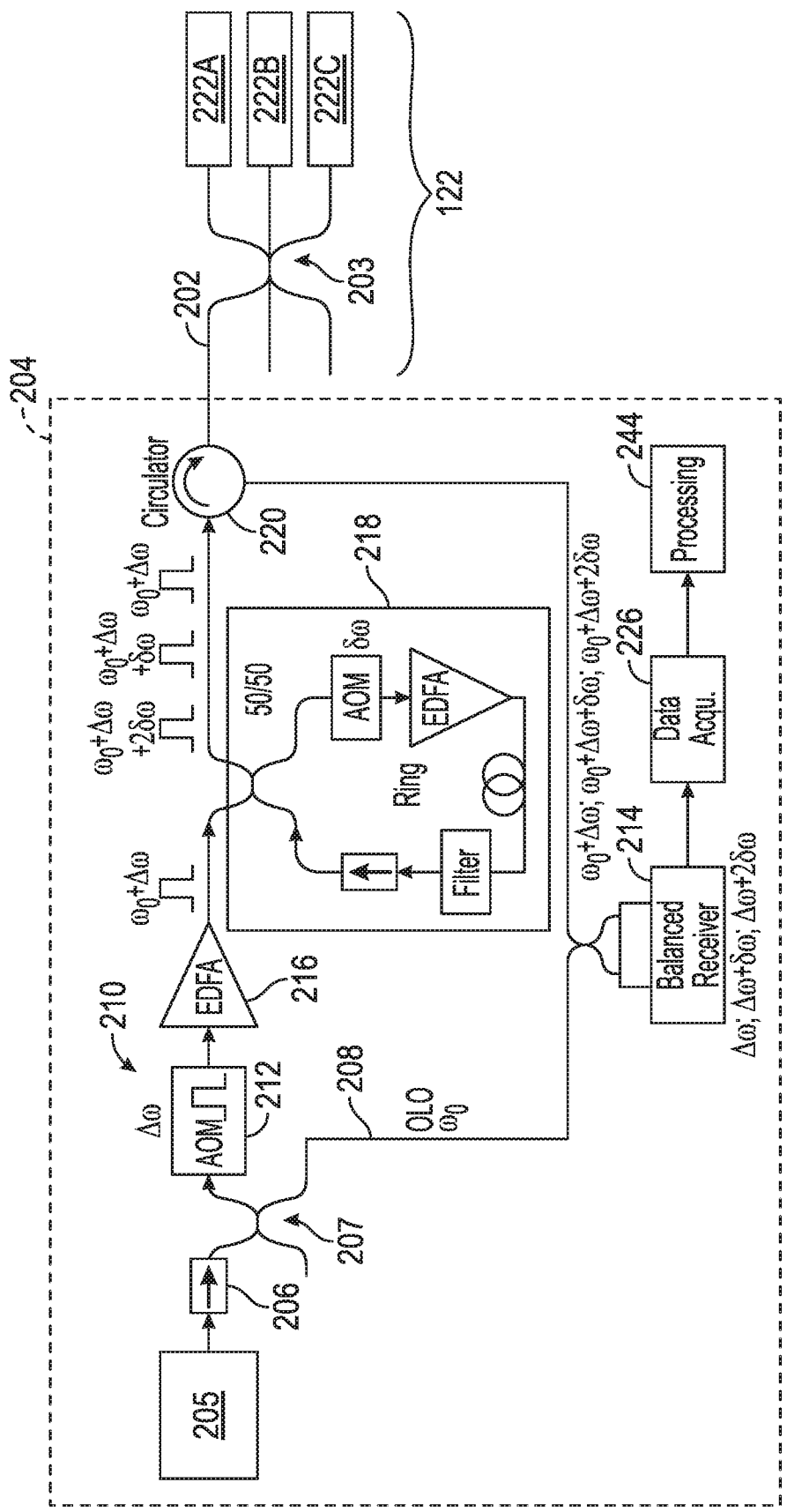
FIG. 3 is a schematic illustration detailing a frequency generator that may be employed in a distributed measuring instrument, according to another embodiment.

FIG. 3 depicts one embodiment of a frequency generator 204. The frequency generator 204 includes a source laser 205 that launches an optical signal through an isolator 206 and coupler 207 that splits the signal into an optical local oscillator path (OLO) 208 and a probe generation path 210. In the probe generation path 210, an acousto-optic modulator 212 simultaneously defines a probe pulse and shifts its frequency by $\omega$. The backscatter returning from the sensing fiber at frequency $\omega_0 + \omega$ is mixed at the receiver 214 with the OLO 208, resulting in a beat (or intermediate frequency) w that preserves the phase of the backscatter signal.

From the acousto-optic modulator 212, the pulse is directed through an erbium doped fiber amplifier 216. The pulse is then split into two at the optical ring circuit 218. The first component becomes the first pulse directed through the circulator 220 to the coupler 203 within the interrogation system 122. The second component is directed into the optical ring circuit 218, which shifts its frequency by $\delta\omega$ and provides optical gain to compensate for the losses in the ring (e.g., caused by splitting, modulator loss, etc.). For each lap k around the ring, a new probe pulse is created at a frequency equal to $\omega 0 + \omega + k\delta\omega$. Within the signal processing system 224, the backscattered signals with different intermediate frequencies$+\omega+k\delta\omega$ from each of the pulses are separated and processed as independent signals. As shown in FIG. 3, the receiver 215, data acquisition system 226, and signal processing system 224 are included in the frequency generator 204. However, in other embodiments, the processing system 124 within the instrument 119 may be employed instead.

Returning to FIG. 2, each path from the coupler 203 is directed to a pulse selector filter 222 that selects specific frequencies to be sent to each sensing fiber 110A, 110B, and 110C. Each sensing fiber 110 has a separate pulse selector filter 222. As discussed above, the coupler 203 may receive three pulses, each at a different frequency, substantially simultaneously. For example, at a first time, to, the frequency generator may send three signals at frequencies $f_1$, $f_2$, and $f_3$; at a second time, $t_1$, the frequency generator may send three signals at frequencies $f_4$, $f_5$, and $f_6$; and at a third time $t_3$, the frequency generator may send three signals at frequencies $f_7$, $f_8$, and $f_9$. According to one example, pulse selector filter 222A filters out the first, fourth, and seventh frequencies and directs these pulses to sensing fiber 110A; pulse selector filter 222B filters out the second, fifth, and eighth frequencies and directs these pulses to sensing fiber 110B; and pulse selector filter 222C filters out the third, sixth, and ninth frequencies and directs these pulses to sensing fiber 110C. However, in other embodiments, the pulse selector filters 222 may be set to filter out other frequencies. When the backscatter signal comes back to the instrument 117 from the sensing fibers 110A, 110B, and 110C, the backscatter signal can be processed independently for each sensing fiber 110A, 110B, and 110C due to the knowledge of the frequencies used to interrogate it.

Figure 4:
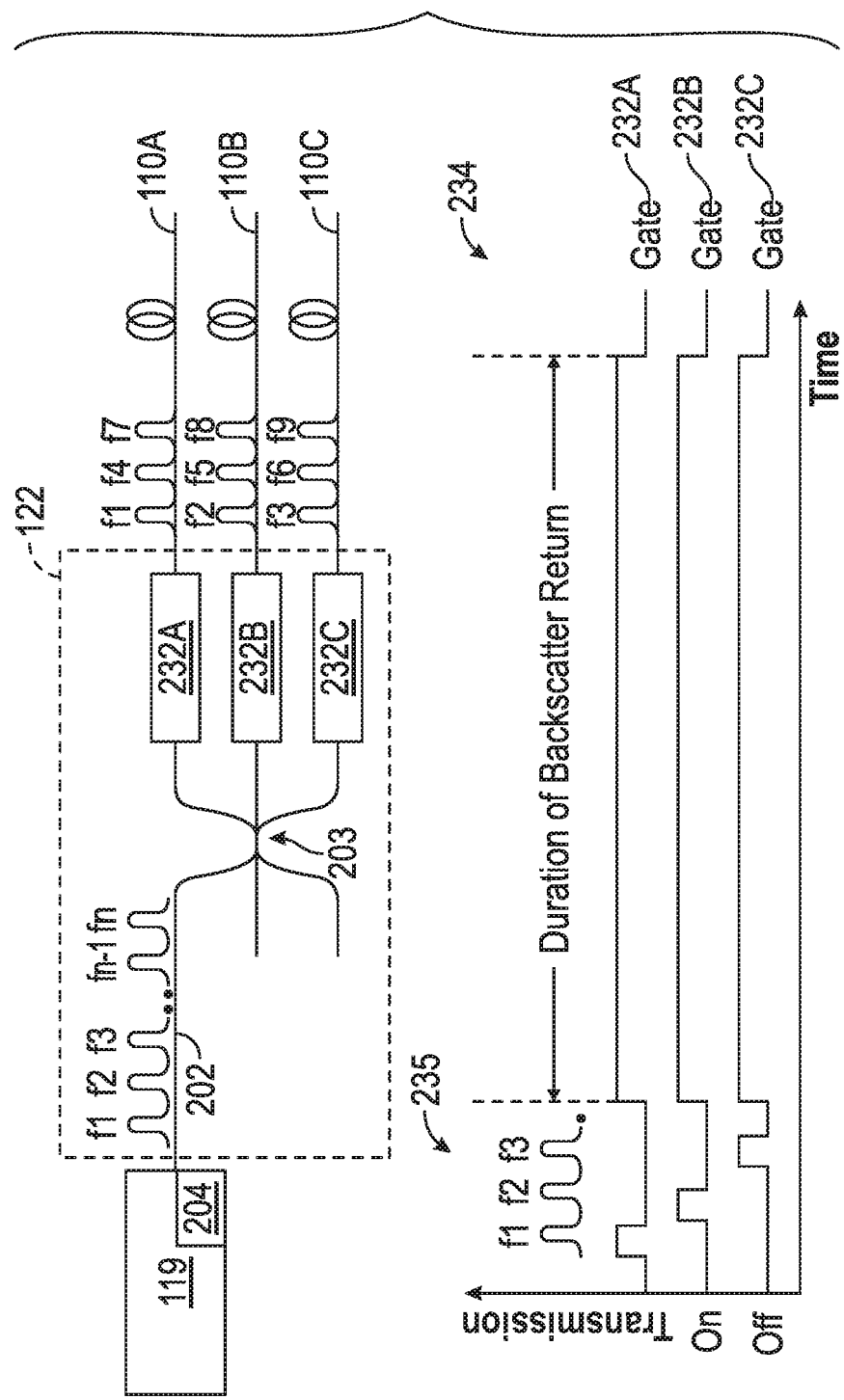
FIG. 4 is a schematic illustration of another embodiment of an interrogation system, according to one or more aspects of the present disclosure.

FIG. 4 depicts another embodiment of an interrogation system 122 that may be used to connect an instrument 119 to multiple sensing fibers 110. However, rather than employing pulse selector filters, the interrogation system 122 includes gates 232 that function as a fast optical switch.

As shown in FIG. 4, the frequency generator 204 can be employed to launch multiple optical pulses at different frequencies that are directed to the coupler 203 via the output fiber section 202. The coupler 203 separates the pulse signals from the distributed measuring instrument 119 into a number of paths, corresponding to the number of fibers 110 within the well system 100. The frequency generator 204 and coupler 203 operate as described above in detail with respect to FIGS. 2-3.

Rather than filtering the output from the coupler 203 with pulse selector filters 222 as described above with respect to FIG. 2, the interrogation system 122 directs the output of the coupler 203 to gates 232A, 232B, and 232C. Each gate 232A, 232B, and 232C directs pulses to a corresponding sensing fiber 110A, 110B, and 110C. The gates 232A, 232B, and 232C are used to reject those pulses that are required not to be launched into its respective fiber 110A, 110B, or 110C, as illustrated by the timing diagram 234. For example, as discussed further above with respect to FIG. 2, at to, the frequency generator 204 may launch three pulses in short succession, with each pulse having a different frequency $f_1$, $f_2$, and $f_3$. As shown by section 235 of the timing diagram 234, the interrogation system 122 may transmit drive signals to the gates 232A, 232B, and 232C to open and close the gates in quick succession, synchronized to the rate the pulses reach the gates 232. Accordingly, gate 232A may open first, while gates 232B and 232C remain closed, to direct the pulse signal with a frequency $f_1$ to sensing fiber 110A. Gate 232A may then close, while gate 232B opens to direct the pulse signal with a frequency $f_2$ to sensing fiber 110B. Gate 232B may then close, while gate 232C opens to direct the pulse signal with a frequency $f_3$ to sensing fiber 110C.

When not rejecting pulses, the gates 232 are otherwise open, including remaining open to allow the backscatter from each of the sensing fibers 110A, 110B, and 110C to return to the instrument 119. Within the instrument 119, each frequency pulse is interpreted as the signal from a specific fiber 110. Accordingly, the interrogation system 122 enables a single optical interrogator to be employed to interrogate multiple fibers 110 simultaneously and independently. In this embodiment, the gates 232 allow the sampling rate (e.g., the repetition rate of the probe pulses entering the fiber 110) for each fiber to be the same as the rate used for single fiber interrogation.

FIGS. 2-4 depict embodiments of how a single interrogation system 122 may be employed to connect an instrument 117, 119, and 121 to multiple sensing fibers 110. Although the sensing fibers 110A, 110B, and 110C are illustrated as being disposed in separate boreholes 104, in other embodiments, the interrogation system 122 may be employed to connect one or more instruments 117, 119, and 121 to multiple sensing fibers 110 disposed in the same well, or in the same well in different borehole locations (e.g., multilaterals).

Figure 5:
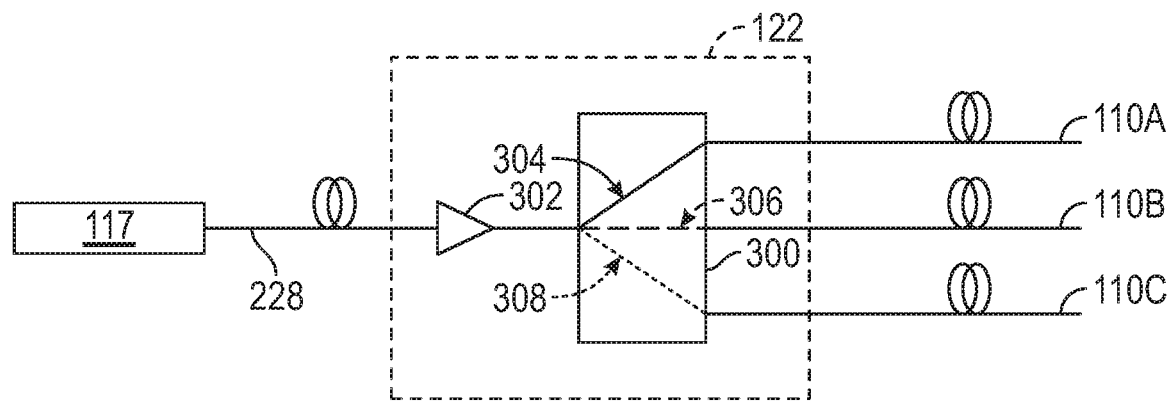
FIG. 5 is a schematic illustration of a further embodiment of an interrogation system, according to one or more aspects of the present disclosure.

FIG. 5 depicts another embodiment of the interrogation system 122 that may be employed to connect one or more instruments 117, 119, and 121 to multiple sensing fibers 110. Rather than including pulse selector filters or gates as described above with respect to FIGS. 2 and 4, the interrogation system 122 includes a fast optical switch 300 designed to selectively launch pulses from the instrument 117 to each of the sensing fibers 110A, 110B, and 110C. FIG. 5 depicts the connection between the first distributed measuring instrument 117 and the interrogation system 122. However, the second and third distributed measuring instruments 119 and 121 can be connected to the interrogation system 122 in a similar manner, as discussed further below with regard to FIGS. 6 and 7.

As shown in FIG. 5, an output fiber section 228 connects the instrument 117 to the interrogation system 122. The instrument 117 directs a high power optical pulse through the output fiber section 228 to the interrogation system 122 where the fast optical switch 300 synchronizes the launch of optical pulses from the instrument 117 to each of the sensing fibers 110A, 110B, and 110C sequentially. In certain embodiments, the interrogation system 122 may use a voltage TTL or CMOS drive signal to control the switching state, which is synchronized with the pulse sample rate sent by the instrument 117.

According to certain embodiments, the fast optical switch 300, selects each sensing fiber 110A, 110B, and 110C in rapid succession. For example, at to the fast optical switch 300 may connect the output fiber section 228 to the sensing fiber 110A via a first path 304; at $t_1$, the fast optical switch 300 may connect the output fiber section 228 to the sensing fiber 110B via a second path 306; and at $t_2$ the fast optical switch 300 may connect the output fiber section 228 to the sensing fiber 110C via a third path 308. In certain embodiments, the instrument 117 may launch signal pulses in rapid succession and accordingly, the fast optical switch 300 may sequentially select each sensing fiber 110 in a corresponding rapid succession, such as within nano or microseconds. Accordingly, the drive signal from the fast optical switch 300 is synchronized with the pulse rate from the instrument 117 enabling the fast optical switch 300 to operate in a path selection period that is synchronized with the time between pulses from the instrument 117. In other embodiments, rather than selecting each sensing fiber 110 directly through the paths 304, 306, and 308, the fast optical switch 300 may use a splitter followed by on/off switches disposed in a branched arrangement.

When the backscatter signal returns to the instrument 117 from the sensing fibers 110A, 110B, and 110C, the signal processing may also be synchronized with the fast optical switch 300 drive signal to identify which backscatter signal is originating from each sensing fiber. Further, one or more reconstruction algorithms may be employed using external measurements that record the seismic source data, such as a seismic source geophone signature, during the pulse time lapse.

As shown in FIG. 5, the interrogation system 122 also may include a remote optical amplifier 302 to enable interrogation of multiple wells located far from the surface. For example, the remote optical amplifier 302 may be particularly well-suited to offshore wells were umbilicals are significantly long and drymate/wetmate connectors are attenuating the optical signal and deteriorating the signal to noise ratio of the data. The remote optical amplifier 302 is co-located with the fast optical switch 300, allowing the interrogation system 122 to be located at the wellhead and driven by a subsea TTL or CMOS signal, eliminating the need for including electronics remotely at the wellhead. According to certain embodiments, the remote optical amplifier 302 may have two fiber sections where the second section includes a fiber doped with rare-earth ions to compensate for the attenuation losses in the intensity of the probe wavelength in the first section. This enables the second section to have optimized gain to maintain the same signal to noise ration. Further details of remote optical amplifiers that may be employed in the interrogation system 122 are described in U.S. Pat. No. 7,595,865, which is incorporated herein by reference in its entirety for all purposes. Although the remote optical amplifier 302 is disposed between the fast optical switch 300 and the instrument 117 in FIG. 5, in other embodiments, the remote optical amplifier 300 may be disposed between the fast optical switch 300 and the sensing fibers 110.

Figure 6:
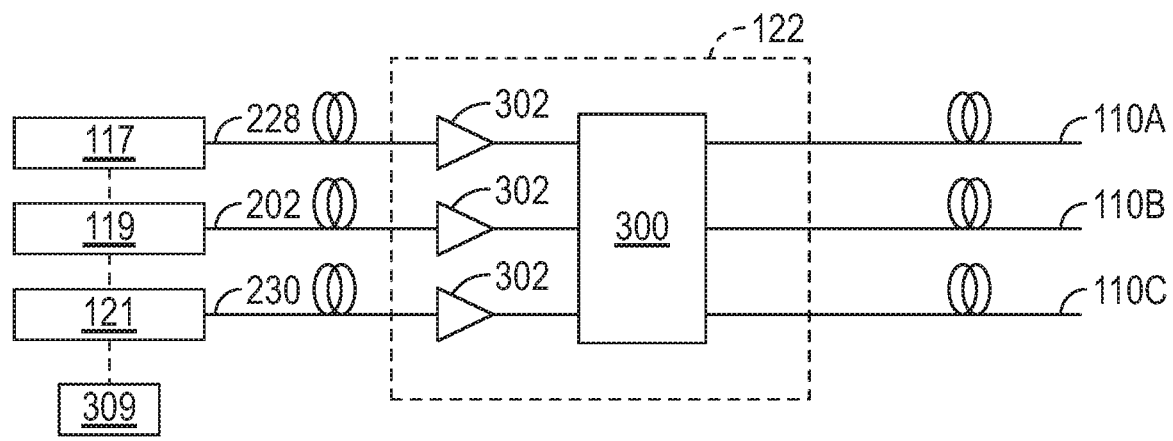
FIG. 6 is a schematic illustration of a further embodiment of an interrogation system, according to one or more aspects of the present disclosure.
Figure 7:
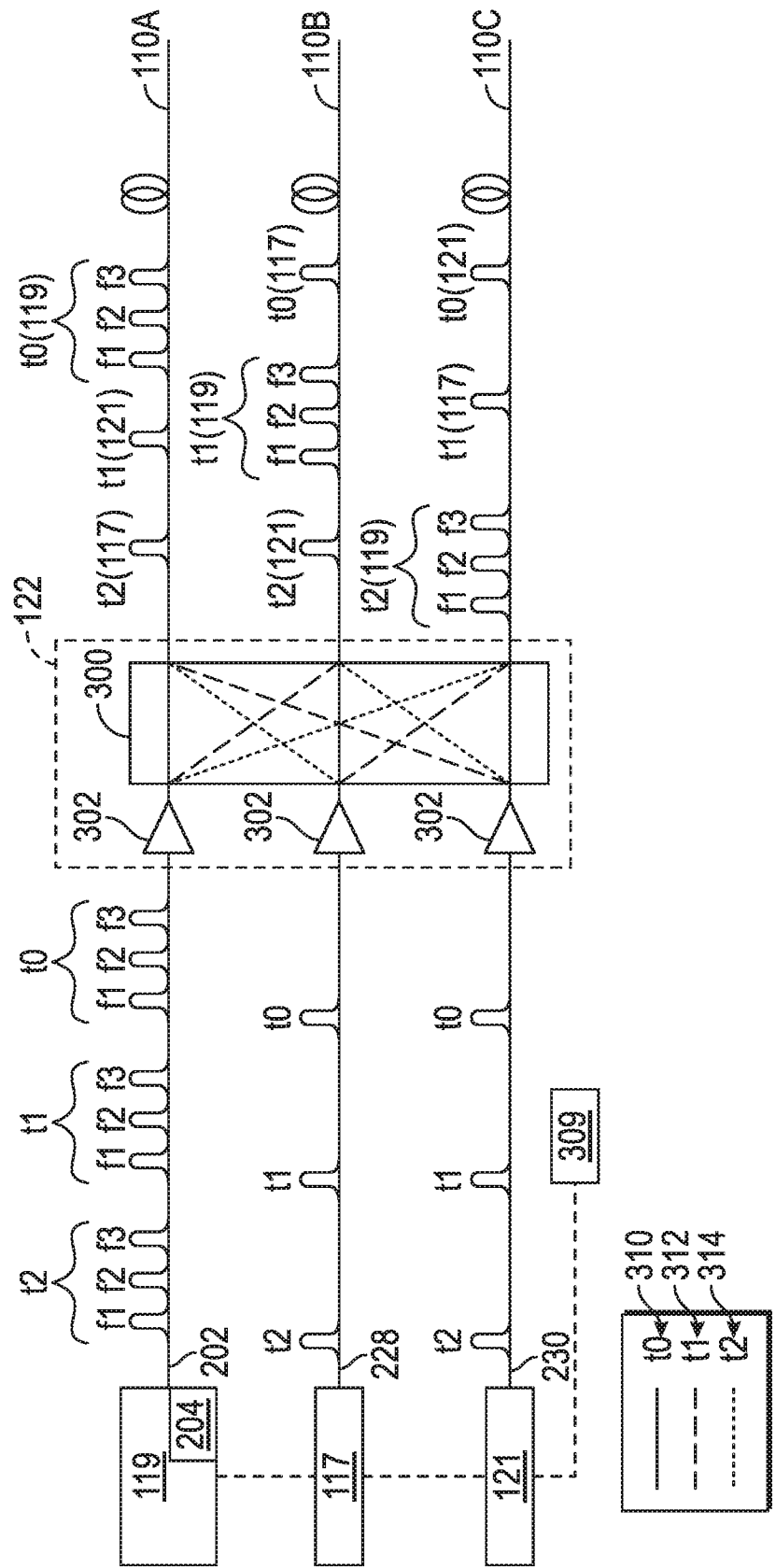
FIG. 7 is a schematic illustration of a further embodiment of an interrogation system, according to one or more aspects of the present disclosure.

As discussed above, the interrogation system 122 may be employed to connect one or more instruments 117, 119, and 121 to the sensing fibers 110 in a well system 100. FIGS. 6 and 7 depict an embodiment where the interrogation system 122 is used to connect three separate instruments 117, 119, and 121 to the sensing fibers 110A, 110B, and 110C. An output fiber section 228, 202, and 230 connects each instrument 117, 119, and 121, respectively, to the interrogation system 122.

Each instrument 117, 119, 121 launches a high power optical pulse through the output fiber section 202, 228, and 230 to the interrogation system 122. The pulses from each instrument 117, 119, and 121 may be of the same or different frequencies. A driver 309 may be communicatively coupled to the instruments 117, 119, and 121 to synchronize the pulse signals from the instruments. For example, in certain embodiments, each instrument 117, 119, and 121 may include an internal clock and the driver 309 can be employed to synchronize these clocks so that the signals from each instrument 117, 119, and 121 can be launched simultaneously, or in rapid succession.

As shown in FIGS. 6 and 7, the driver 309 is directly coupled to instrument 121; coupled to instrument 119 via instrument 121; and coupled to instrument 117 via instruments 119 and 121. However, in other embodiments the driver 309 may be directly coupled to one or more of the instruments 117, 119, and 121. Further, the driver 309 is coupled to the fast optical switch 300 via the instruments 117, 119, and 121; however, in other embodiments, the driver 309 may be directly coupled to the fast optical switch 300.

Within the interrogation system 122, the fast optical switch 300 synchronizes the launch of the optical pulses to each of the sensing fibers 110A, 110B, and 110C in succession. For example, a driver 309 may send a TTL or CMOS drive signal to the interrogation system 122 to control the switching state and direct the pulses to the sensing fibers 110. As shown in FIG. 7 by the solid line paths 310, at $t_0$, the interrogation system 122 may be set to direct the pulse from instrument 119 to sensing fiber 110A for a DVS measurement. In certain embodiments, the instrument 119 may include a frequency generator 204 to launch sets of multiple pulses (three shown in FIG. 7), each at a different frequency. However, in other embodiments, the instrument may generate a single pulse at each time.

As shown by the solid line path 310, at $t_0$, the interrogation system 122 directs the pulse, or group of pulses, from instrument 119 to sensing fiber 110A for a DVS measurement. Also at $t_0$ and shown by solid line path 310, the interrogation system 122 directs the pulse from instrument 117 to sensing fiber 110B for a DTS measurement. Further, at $t_0$ and shown by solid line path 310, the interrogation system 122 directs the pulse from instrument 121 to sensing fiber 110C for a DSS measurement.

The fast optical switch 300 may then direct the next set of pulses from the instruments to the other sensing fibers in succession. For example, at $t_1$ and as shown by the dashed line path 312, the interrogation system 122 may direct the pulse from instrument 119 to sensing fiber 110B for a DVS measurement, while directing the pulse from instrument 117 to the sensing fiber 110C for a DTS measurement and while directing the pulse from instrument 121 to the sensing fiber 110A for a DSS measurement. Finally, at $t_2$ and as shown by the dotted line paths 314, the interrogation system 122 may then direct the pulse from instrument 117 to sensing fiber 110C for a DTS measurement, while directing the pulse from instrument 119 to the sensing fiber 110A for a DVS measurement and while directing the pulse from instrument 121 to the sensing fiber 110B for a DSS measurement.

The interrogation system 122 synchronizes the drive signal for the fast optical switch 300 with all of the instruments 117, 119, and 121 to allow switching between the fibers 110 within the response time of the fast optical switch 300. By directing the pulses from each instrument 117, 119, and 121 to the different sensing fibers 110A, 110B, and 110C in succession, multiple types of distributed measurements may be obtained from each of the wells in the well system through the fibers 110. Further, substantially simultaneous measurements from each of the instruments 117, 119, and 121 may be taken via the fibers 110. For example, while fiber 110A is receiving a DVS pulse, fiber 110B may receive a DTS pulse, and fiber 110C may receive a DSS pulse. Accordingly, multiple types of distributed measurements may be gathered substantially simultaneously in different wells or in different locations within the same well.

As shown in FIG. 7, the interrogation system 122 also may include remote optical amplifiers 302 to enable interrogation of multiple wells located far from the surface. As shown, a remote optical amplifier 302 is positioned before the fast optical switch 300 in the fiber output section from each instrument 117, 119, and 121. However, in other embodiments, the remote optical amplifiers 302 may be disposed after the fast optical switch 300.

Figure 8:
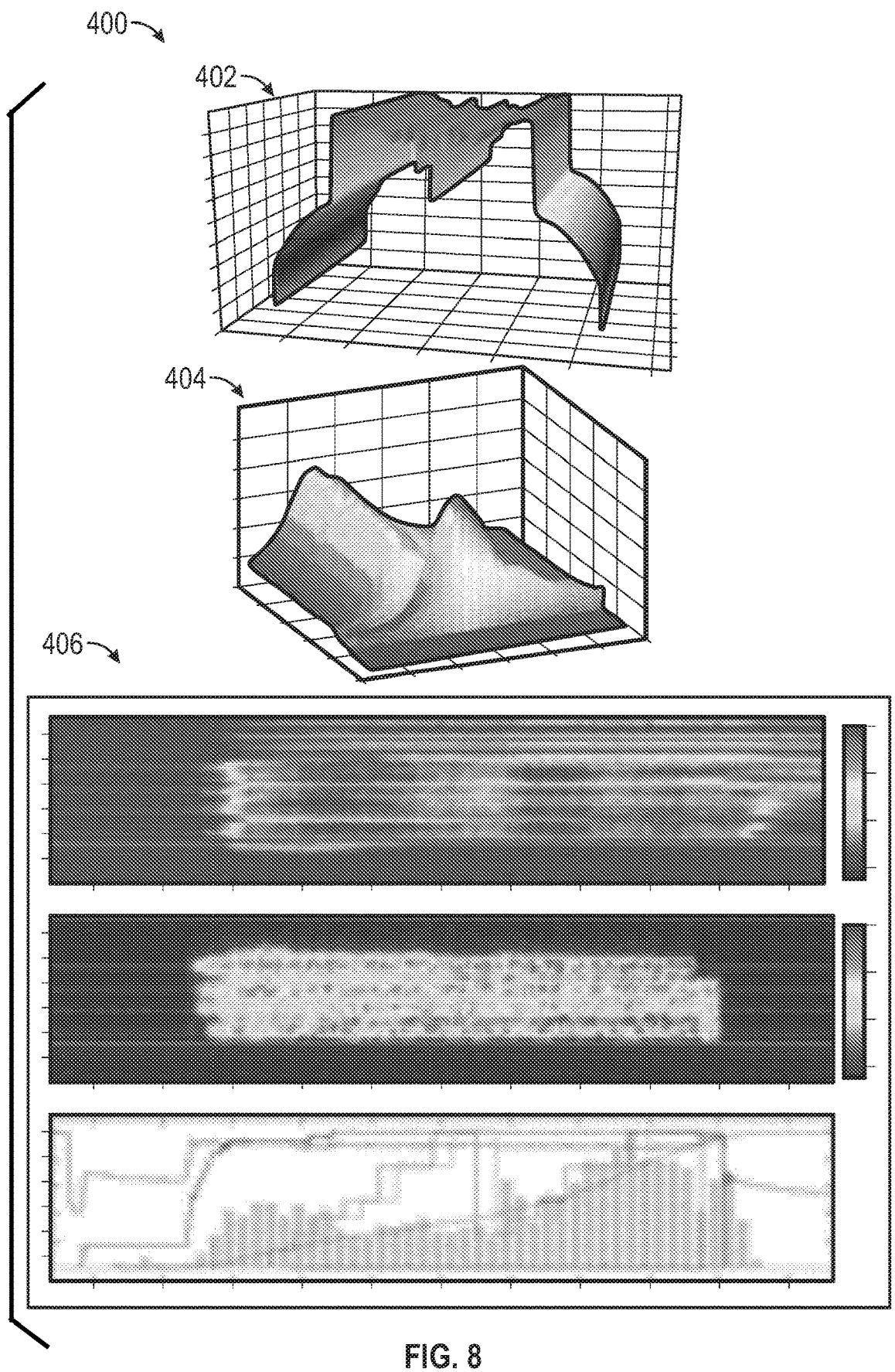
FIG. 8 is an illustration of a data display obtained using an interrogation system, according to one or more aspects of the present disclosure.

FIG. 8 depicts an embodiment of a data display 400 enabled by the interrogation systems 122 described in FIGS. 6-7. The data display 400 represents the real-time data obtained from one of the fibers 110 within a well. For example, the data display 400 may represent the distributed measurements taken with fiber 110A in borehole 104A, as shown in FIG. 1. The data display includes three graphs 402, 404, and 406 representing DTS, DSS, and DVS data respectively. In certain embodiments, the data display 400 may also include well log data. Although the distributed measurements are taken on a single fiber 110 successively, the rapid succession (e.g., switching between instrument sources with a fast optical switch within microseconds or nanoseconds) allows the measurements to be provided substantially simultaneously.

As discussed above with respect to FIGS. 2-7, the interrogation systems disclosed herein enable use of a single interrogator to take measurements on multiple sensing fibers 110, which can be disposed in separate wells and/or in the same well at different locations. In certain embodiments, a single distributed measuring instrument 117 may be employed in a well system 100 and connected to an interrogation system 122 to take measurements on multiple sensing fibers 110. Further, in other embodiments, two, three or more distributed measuring instruments 117, 119, and 121 may be connected to the interrogation system 122 and used to take measurements on multiple sensing fibers. Moreover, in other embodiments, one instrument, such as DVS instrument 119, may be connected to an interrogation system 122 that employs pulse selector filters as described above with respect to FIG. 2 or gates as described above with respect to FIG. 4, while other instruments, such as DTS instrument 117 and DSS instrument 121, may share another interrogation system 122 that employs a fast optical switch, as described above with respect to FIG. 5-7.

As described with respect to FIGS. 6 and 7, in certain embodiments, the interrogation systems 122 enable different types of distributed measurements to be taken substantially simultaneously on different sensing fibers 110. Further, although FIG. 1 depicts three wells, each with a sensing fiber 110A, 110B, and 110C, in other embodiments, a well system may include any number of wells, each with their own sensing fiber. Moreover, the sensing fibers 110A, 110B, and 110C and the fiber sections 202, 228, and 230 can be multi-mode fibers, single-mode fibers, or any combination thereof.

Further, it also should be understood that embodiments of the sensing systems described herein with respect to FIGS. 2-7 are not limited to sensing systems that include a DTS system, a DVS system, and a DSS system, or to three distributed sensing systems. Rather, the arrangements and techniques described herein also can be applied to sensing systems in which the interrogation system 122 enables one or more distributed measurements to be sent to multiple sensing fibers. For example, the interrogation system 122 can be used to simultaneously measure one or more of distributed temperature, distributed strain, distributed vibration and distributed acoustic measurements on multiple sensing fibers 110.

In some embodiments, the systems and techniques described herein can be employed in conjunction with an intelligent completion system disposed within a well that penetrates a hydrocarbon-bearing earth formation. Portions of the intelligent completion system may be disposed within cased portions of the well, while other portions of the system may be in the uncased, or open hole, portion of the well. The intelligent completion system can comprise one or more of various components or subsystems, which include without limitation: casing, tubing, control lines (electric, fiber optic, or hydraulic), packers (mechanical, swell or chemical), flow control valves, sensors, in flow control devices, hole liners, safety valves, plugs or inline valves, inductive couplers, electric wet connects, hydraulic wet connects, wireless telemetry hubs and modules, and downhole power generating systems. Portions of the systems that are disposed within the well can communicate with systems or sub-systems that are located at the surface. The surface systems or subsystems in turn can communicate with other surface systems, such as systems that are at locations remote from the well.

While the invention has been disclosed with respect to a limited number of embodiments, those skilled in the art, having the benefit of this disclosure, will appreciate numerous modifications and variations there from. It is intended that the appended claims cover such modifications and variations as fall within the true spirit and scope of the invention.

What is claimed is:

1. A distributed measurement system, comprising:
    a first distributed optical sensing fiber deployed along a first desired measurement path;
    a second distributed optical sensing fiber deployed along a second desired measurement path;
    an interrogation system coupled to the first distributed optical sensing fiber and to the second distributed optical sensing fiber; and
    a first distributed measuring instrument to launch a first interrogating probe pulse set comprising a first pulse having a first frequency and a second pulse having a second frequency;
    wherein the interrogation system is configured to direct the first pulse to the first distributed optical sensing fiber and the second pulse to the second distributed optical sensing fiber.

2. The distributed measurement system of claim 1, wherein the first distributed measuring instrument is configured to acquire first measurement data from backscattered light generated by the first distributed optical sensing fiber in response to the first pulse and to acquire second measurement data from backscattered light generated by the second distributed optical sensing fiber in response to the second pulse.

3. The distributed measurement system of claim 1, wherein the interrogation system comprises a remote optical amplifier and is not co-located with the first distributed measuring instrument.

4. The distributed measurement system of claim 1, wherein the interrogation system comprises a first pulse selector filter configured to filter out the second pulse and direct the first pulse to the first distributed optical sensing fiber and a second pulse selector filter configured to filter out the first pulse and direct the second pulse to the second distributed optical sensing fiber.

5. The distributed measurement system of claim 1, wherein the interrogation system comprises a first gate to direct the first pulse into the first distributed optical sensing fiber and a second gate to direct the second pulse into the second distributed optical sensing fiber.

6. The distributed measurement system of claim 1, wherein the interrogation system comprises a fast optical switch to direct the first interrogating probe pulse set to the first distributed optical sensing fiber and to direct a subsequent second interrogating probe pulse set to the second distributed optical sensing fiber.

7. The distributed measurement system of claim 1, wherein the first distributed measuring instrument comprises a distributed temperature sensing instrument, a distributed vibration sensing instrument, or a distributed strain sensing instrument.

8. The distributed measurement system of claim 1, wherein the first desired measurement path is along a first borehole penetrating a hydrocarbon reservoir and wherein the second desired measurement path is along a second borehole penetrating the hydrocarbon reservoir.

9. A distributed measurement system, comprising:
    a plurality of distributed optical sensing fibers each deployed along a separate measurement path;
    an interrogation system coupled to the plurality of distributed optical sensing fibers; and
    a plurality of distributed measuring instruments, each coupled to the interrogation system and each configured to generate a first interrogating probe pulse to launch into the interrogation system at a first time and a second interrogating probe pulse to launch into the interrogation system at a second time;
    wherein the interrogation system is configured to direct each of the first interrogating probe pulses into a separate distributed optical sensing fiber and to direct each of the second interrogating probe pulses into another separate distributed optical sensing fiber.

10. The distributed measurement system of claim 9, wherein the interrogation system is configured to direct the first interrogating probe pulse originating from a first distributed measuring instrument, of the plurality of distributed measuring instruments, into a first distributed optical sensing fiber, of the plurality of distributed optical sensing fibers, while directing a second interrogating probe pulse originating from a second distributed measuring instrument, of the plurality of distributed measuring instruments, into a second distributed optical sensing fiber, of the plurality of distributed optical sensing fibers.

11. The distributed measurement system of claim 10, wherein the interrogation system is configured to direct the second interrogating probe pulse, originating from the first distributed measuring instrument, into the second distributed optical sensing fiber while directing the second interrogating probe pulse, originating from the second distributed measuring instrument, into a third distributed optical sensing fiber, of the plurality of distributed optical sensing fibers.

12. The distributed measurement system of claim 9, wherein the interrogation system comprises a first remote optical amplifier coupled to a first output fiber section of a first distributed measuring instrument, of the plurality of distributed measuring instruments, and a second remote optical amplifier coupled to a second output fiber section of a second distributed measuring instrument, of the plurality of distributed measuring instruments.

13. The distributed measurement system of claim 9, wherein the plurality of distributed measuring instruments comprises a distributed temperature sensing instrument, a distributed vibration sensing instrument, and a distributed strain sensing instrument.

14. The distributed measurement system of claim 9, wherein the first interrogating probe pulse comprises a set of pulses, each having a different frequency.

15. A method for making simultaneous distributed measurements along a plurality of distributed optical sensing fibers each deployed along a separate measurement path, comprising:
launching a first series of interrogating probe pulses from a first distributed measuring instrument to an interrogation system; and
directing the interrogating probe pulses of the first series sequentially to a first distributed optical sensing fiber deployed along a first desired measurement path and to a second distributed optical sensing fiber deployed along a second desired measurement path.

16. The method of claim 15, comprising acquiring a distributed measurement of a first parameter of interest from the first distributed optical sensing fiber and acquiring a distributed measurement of a second parameter of interest from the distributed optical sensing fiber, wherein the first parameter of interest is the same as the second parameter of interest.

17. The method of claim 15, comprising acquiring a distributed measurement of a first parameter of interest from the first distributed optical sensing fiber simultaneously with acquiring a distributed measurement of a second parameter of interest from the second distributed optical sensing fiber, wherein the first parameter of interest is different than the second parameter of interest.

18. The method of claim 17, wherein the first parameter of interest is temperature and the second parameter of interest is vibration or strain.

* * * * *